United States Patent [19]
Lehmann

[11] 3,918,775
[45] Nov. 11, 1975

[54] BEARING HOUSING FOR A CALENDER

[75] Inventor: Rolf Lehmann, Mutschellen, Switzerland

[73] Assignee: Escher Wyss Limited, Zurich, Switzerland

[22] Filed: Mar. 27, 1974

[21] Appl. No.: 455,301

[30] Foreign Application Priority Data
Apr. 16, 1973 Switzerland.................... 5412/73

[52] U.S. Cl................. 308/193; 29/111; 100/162 R
[51] Int. Cl.²........................................ F16C 33/38
[58] Field of Search ............... 308/15, 59, 188, 193; 29/110, 116 R, 116 AD, 111; 100/161, 168, 162 R

[56] References Cited
UNITED STATES PATENTS

| | | | |
|---|---|---|---|
| 2,223,628 | 12/1940 | Landis............................ | 29/111 UX |
| 2,592,048 | 4/1952 | Linden............................ | 29/111 X |
| 3,066,876 | 12/1962 | Verdier........................... | 100/161 X |
| 3,367,262 | 2/1968 | Stevens et al.................. | 100/162 R |

Primary Examiner—Lloyd L. King
Assistant Examiner—Michael Mar
Attorney, Agent, or Firm—Kenyon & Kenyon Reilly Carr & Chapin

[57] ABSTRACT

The rolls of the calender have roll necks which are each journalled in a bearing block which, in turn, is slidably mounted in a bearing housing to move in the direction of movement of the rolls upon opening of the calender. The roll necks can be journalled by antifriction bearings in the blocks or the blocks may function as an outer race of the bearings.

8 Claims, 6 Drawing Figures

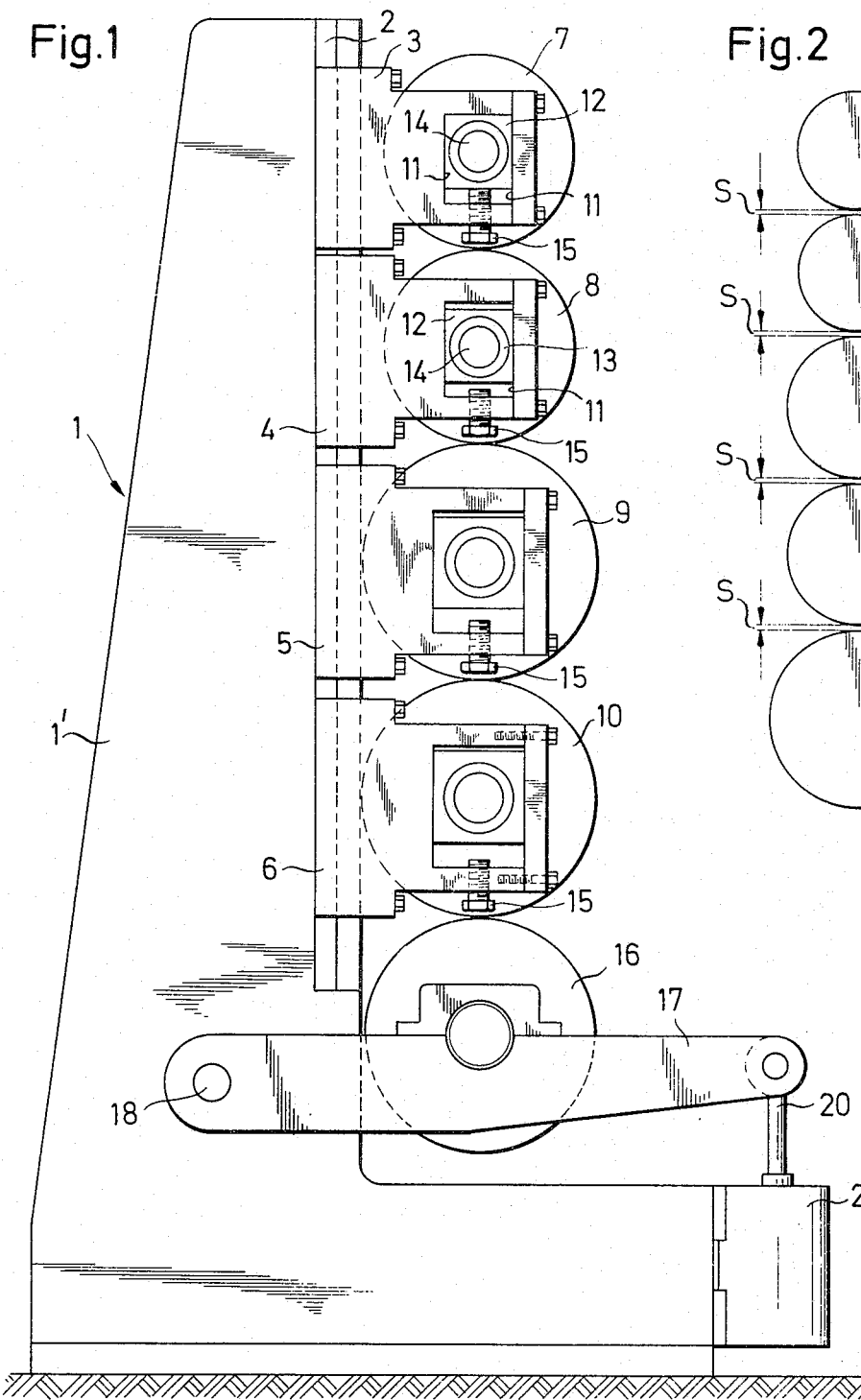

BEARING HOUSING FOR A CALENDER

This invention relates to a calender and more particularly to the mounting of a roll within the calender.

Calenders have been known in which a plurality of rolls have been mounted, for example, in superjacent relation, and have been adapted for movement away from each other upon opening of the calender. Generally, it has usually been necessary for such a calender to be opened as rapidly as possible, that is, it must be possible for the rolls of the calender to be moved apart so that a gap is produced between the rolls. To this end, the rolls have had the ends formed as roll necks which have been supported in bearing housings which can be moved along a stand. The hearing housings have, in turn, been allowed to strike stop abutments at the end of their opening motion. However, this has resulted in large impact forces being applied to the bearings. The large impact forces, in turn, call for relatively large bearings and heavy bearing housings. In addition, because of the size and weight, the bearing housings with the bearings load the roll necks of the calender rolls when the calender is closed causing deformation of the rolls. This leads to edge pressure at the ends of the rolls.

Accordingly, it is an object of the invention to avoid edge pressure in the rolls of a calender.

It is another object of the invention to provide a simplified mounting of a roll in a calender.

It is another object of the invention to reduce the weight of a bearing housing of a calender roll.

Briefly, the invention provides a calender having a plurality of rolls which are movable in a predetermined direction upon opening of the calender and at least some of which have roll necks, a plurality of bearing housings, each of which has guides oriented in the direction of movement of the rolls and bearing blocks. Each bearing block has a roll neck journalled therein and is slidably mounted in the guides of a respective bearing housing to slide in the direction of movement of the rolls. In addition, the calender has a common guide means for mounting the bearing housings. This guide means is, in turn, supported in vertical disposition on a stand.

A substantial reduction of the masses which load the roll necks is achieved by separating the bearing housings from the bearing blocks disposed therein during operation so that edge pressure is practically avoided.

The bearing housings may preferably be constructed in the form of a frame and contain parallel guide surfaces as the guides in which substantially rectangular bearing blocks are guided by means of appropriate surfaces. Furthermore, the bearing housings can be provided with adjustable stop abutment means to limit the opening motion of the affected roll. The stop abutment means can preferably be constructed as screwthreaded studs which are adjustable in the direction of motion of the bearing blocks. This enables a simply constructed embodiment to be obtained which is reliable and capable of satisfying all operational requirements.

The bearing block can also be used as outer race of an anti-friction ball bearing if the roll neck is journalled in rectangular bearing blocks. This minimizes the mass that applies bending stresses to the roll neck and causes edge pressure.

The advantages of the construction according to the invention are most marked in a vertical calender with vertical guide means on which the bearing housings are adjustably mounted and wherein the guides of the bearing housings themselves also extend vertically. The invention can, however, also be applied to different calender embodiments, for example, those that are disposed at an angle.

These and other objects and advantages of the invention will become more apparent from the following detailed description and appended claims taken in conjunction with the accompanying drawings in which:

FIG. 1 diagrammatically illustrates a side view with a partial section of a calender according to the invention;

FIG. 2 diagrammatically illustrates the gaps between the individual rolls when the calender is open;

Figure 3:
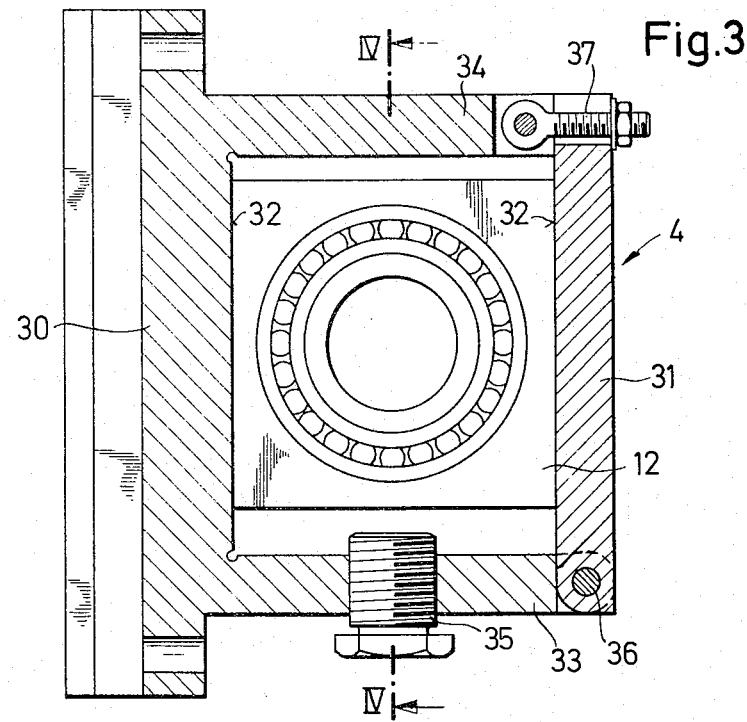
FIG. 3 illustrates a sectional view through a bearing housing with the bearing of the roll neck of one of the rolls.

Referring to FIG. 1, the calender includes a stand 1 which may be constructed as a frame and which contains, for example, two vertical side parts 1. Each of these side parts 1 is provided with a guide 2 on which bearing housings 3, 4, 5, 6 of rolls 7, 8, 9, 10 are mounted in common superjacent relation. The bearing housings 3 – 6 are adjustable along the respective guides 2 in any suitable manner and, in turn, are each provided with guides 11 in which bearing blocks 12 of the individual rolls 7 – 10 are guided. Each bearing block 12 contains a bearing 13 in which a roll neck or trunnion of a roll 7 – 10 is rotatably supported. A stop abutment means 15, is also provided in each bearing housing 3 – 6 to limit the opening downward movement of the bearing blocks 12 and roll and to support the rolls in spaced relation to each other to define gaps S of predetermined size upon opening of the calender. These stop abutment means 15 are adjustable to vary the gap S between the individual rolls 7 – 10 as shown in FIG. 2 when the calender is open.

The ends of the bottom roll 16 are supported on levers 17, one end of each of which bears on studs 18 on the stand 1 and the other end of which is associated with a piston rod 20 of a cylinder 21. Appropriate operation of the cylinder 21 enables the roll 16 to be pressed against the bottom roll 10 or to be lowered so that the rolls 8, 9, and 10 drop onto their stop abutment means 15. This results in the appearance of the gaps S between the individual rolls as illustrated in FIG. 2.

Figure 4:
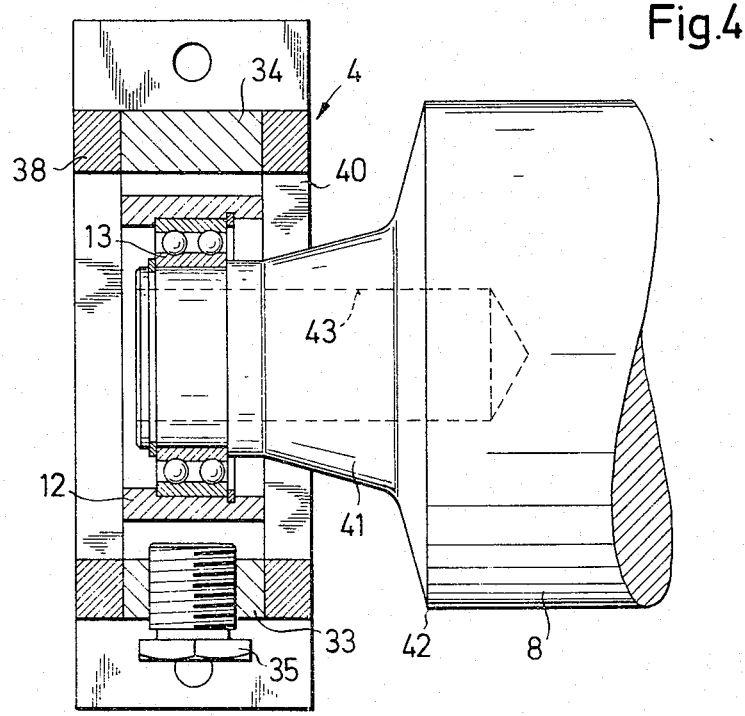
FIG. 4 illustrates a view taken on line IV—IV of FIG. 3.

Referring to FIGS. 3 and 4, each bearing housing, for example, the bearing housing 4 with a bearing block 12, is constructed in the manner of a frame and contains two guides 30, 31 on which parallel guide surfaces 32 (FIG. 3) are formed. The guides 30, 31 are joined to each other by cross-members 33, 34. The lower cross-member 33 has a screwthreaded opening into which a stop abutment means, in the form of a stud 35 is threaded. The guide 31 is pivotally mounted at one end on a pivot 36 to facilitate rapid dismantling of the affected roll. The opposite end of the guide 31 is associated with the remainder of the bearing housing 4 by means of a pivotable screw 37 (FIG. 3). As shown in FIG. 4, the bearing housing 4 is provided with side parts 38, 40 to guide the bearing block 12 in the axial orientation of the rod 8. Thus, each bearing block is guided vertically by guide surfaces on four sides.

The bearing 13 that is mounted in the bearing block 12 is an anti-friction ball bearing which is mounted on the roll neck 41 of the roll 8 and is secured in place via suitable spring clips as shown.

In the operative state which is illustrated in FIG. 4, the bearing blocks 12 are lifted off the studs 35. As can be seen, the masses which apply bending stresses to the roll necks 41 and would result in edge pressure on the edge 42 of the affected roll 8 are minimized. Since the weight of the roll necks 41 also has an effect on the deformation of the roll 8, the weight of the roll neck 41 is reduced by forming a bore 43 therein.

Figure 5:
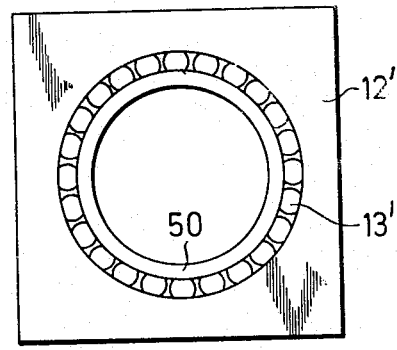
FIG. 5 illustrates a further embodiment of the bearing block and of the bearing for the roll neck according to the invention.

Referring to FIG. 5, the loading applied to the roll neck 41 can be reduced to a minimum by making the bearing block 12 of rectangular shape and by having the block 12 form the outer race of a rolling bearing 13 with an inner race 50. The external dimension of the bearing block 12 of this embodiment can be substantially smaller than would be the case if the bearing according to FIGS. 3 and 4 were to be provided with an outer race which is mounted in a separate bearing block 12.

Figure 6:
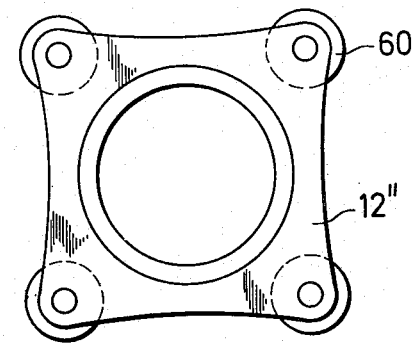
FIg. 6 illustrates a further embodiment of a bearing block according to the invention.

Referring to FIG. 6, the friction of the bearing housing 4 can be reduced and the risk of edges eliminated by providing a guide block 12 with rollers 60 in the corners which are adapted to roll along the guide surfaces 32. The rollers 60 may also be small ball bearings.

What is claimed is:

1. A calender comprising
   a plurality of rolls for movement in a predetermined direction upon opening of the calender, at least some of said rolls having a roll neck at one end;
   a plurality of bearing housings, each respective bearing housing having a plurality of guides therein oriented in said direction;
   a plurality of bearing blocks, each respective bearing block having a respective roll neck journalled therein and being slidably mounted in said guides of a respective bearing housing to slide in said direction upon movement of a respective roll in said direction; and
   a common guide means mounting said bearing housings thereon.

2. A calender as set forth in claim 1 which further comprises an anti-friction bearing journalling each said roll neck in a respective bearing block.

3. A calender as set forth in claim 1 wherein said bearing blocks are rectangular in shape and said guides have parallel guide surfaces.

4. A calender as set forth in claim 1 further comprising adjustable stop abutment means for limiting the opening movement of a respective roll.

5. A calender as set forth in claim 4 wherein each stop means is a screwthreaded stud adjustably mounted in said direction of movement.

6. A calender as set forth in claim 1 wherein each bearing block is of rectangular construction and forms an outer race of an anti-friction bearing journalling a respective roll neck therein.

7. A calender as set forth in claim 1 which further comprises a stand supporting said common guide means thereon in vertical disposition, and wherein said guides for said bearing blocks are vertically disposed.

8. A calender as set forth in claim 1 wherein at least one bearing block includes a plurality of rollers for rollably supporting said block in said guides of a respective bearing housing.

* * * * *